US012671136B2

(12) United States Patent
Song et al.

(10) Patent No.: US 12,671,136 B2
(45) Date of Patent: Jun. 30, 2026

(54) BATTERY MODULE AND BATTERY PACK INCLUDING THE SAME

(71) Applicant: LG ENERGY SOLUTION, LTD., Seoul (KR)

(72) Inventors: Seung Min Song, Daejeon (KR); Sunghwan Jang, Daejeon (KR); Junyeob Seong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 606 days.

(21) Appl. No.: 18/019,196

(22) PCT Filed: Nov. 3, 2021

(86) PCT No.: PCT/KR2021/015784
§ 371 (c)(1),
(2) Date: Feb. 1, 2023

(87) PCT Pub. No.: WO2022/108191
PCT Pub. Date: May 27, 2022

(65) Prior Publication Data
US 2023/0291060 A1 Sep. 14, 2023

(30) Foreign Application Priority Data

Nov. 20, 2020 (KR) ........................ 10-2020-0156686

(51) Int. Cl.
*H01M 50/291* (2021.01)
*H01M 50/211* (2021.01)
(Continued)

(52) U.S. Cl.
CPC ....... *H01M 50/291* (2021.01); *H01M 50/211* (2021.01); *H01M 50/262* (2021.01);
(Continued)

(58) Field of Classification Search
CPC .... H01M 50/20; H01M 50/211; H01M 50/24; H01M 50/262; H01M 50/291; H01M 50/625; Y02E 60/60
(Continued)

(56) References Cited

U.S. PATENT DOCUMENTS 9,385,402 B2 * 7/2016 Kim .................. H01M 10/0436
9,553,286 B2 1/2017 Moon et al.
(Continued)

FOREIGN PATENT DOCUMENTS

CN 203481288 U 3/2014
CN 107615564 A 1/2018
(Continued)

OTHER PUBLICATIONS

International Search Report for PCT/KR2021/015784 (PCT/ISA/210) mailed on Feb. 10, 2022.
(Continued)

*Primary Examiner* — Brian K Talbot
(74) *Attorney, Agent, or Firm* — Birch, Stewart, Kolasch & Birch, LLP

(57) ABSTRACT

A battery module includes a battery cell stack in which a plurality of battery cells are stacked, a first frame member accommodating the battery cell stack and having an open upper portion, a second frame member covering the battery cell stack from an upper portion of the first frame member, a connection portion coupling the first frame member and the second frame member to each other, and an insulating sheet disposed between the battery cell stack and the second frame member, wherein the insulating sheet is disposed to extend up to a region in which the connection portion is positioned.

13 Claims, 6 Drawing Sheets

(51) Int. Cl.

| *H01M 50/262* | (2021.01) |
| *H01M 50/20* | (2021.01) |
| *H01M 50/24* | (2021.01) |

(52) U.S. Cl.

CPC ............ *H01M 50/20* (2021.01); *H01M 50/24* (2021.01); *H01M 2220/20* (2013.01); *Y02E 60/60* (2013.01)

(58) Field of Classification Search

USPC ........................................................ 429/156

See application file for complete search history.

(56) References Cited

U.S. PATENT DOCUMENTS

| 10,074,834 | B2 | | 9/2018 | Moon et al. | |
| 10,355,255 | B2 | * | 7/2019 | Seo ................... | H01M 10/0525 |
| 2014/0045006 | A1 | * | 2/2014 | Yoon ................... | H01M 50/103 |
| | | | | | 429/82 |
| 2017/0194681 | A1 | | 7/2017 | Kim et al. | |
| 2018/0175464 | A1 | | 6/2018 | Kim et al. | |
| 2018/0366717 | A1 | * | 12/2018 | Hu ...................... | H01M 50/176 |
| 2019/0131596 | A1 | | 5/2019 | Yang et al. | |
| 2019/0198952 | A1 | * | 6/2019 | Choi ................... | H01M 50/271 |
| 2020/0144567 | A1 | | 5/2020 | Kim et al. | |
| 2020/0161612 | A1 | | 5/2020 | Lee et al. | |
| 2020/0259152 | A1 | | 8/2020 | Lee et al. | |
| 2022/0077530 | A1 | | 3/2022 | Kim et al. | |
| 2022/0173470 | A1 | | 6/2022 | Yamashiro | |

FOREIGN PATENT DOCUMENTS

| CN | 208570676 | U | | 3/2019 | |
| CN | 209843804 | U | | 12/2019 | |
| CN | 209859994 | U | * | 12/2019 | |
| CN | 209981306 | U | | 1/2020 | |
| CN | 210805831 | U | | 6/2020 | |
| CN | 111668419 | A | | 9/2020 | |
| DE | 10 2013 215 736 | A1 | | 2/2015 | |
| EP | 3 273 509 | B1 | | 6/2020 | |
| EP | 3 276 705 | B1 | | 8/2020 | |
| EP | 3 273 508 | B1 | | 6/2021 | |
| KR | 10-2012-0094706 | A | | 8/2012 | |
| KR | 10-2014-0021961 | A | | 2/2014 | |
| KR | 10-2015-0137262 | A | | 12/2015 | |
| KR | 10-2019-0078521 | A | | 7/2019 | |
| KR | 10-2019-0104441 | A | | 9/2019 | |
| KR | 10-2019-0107398 | A | | 9/2019 | |
| KR | 10-2020-0008624 | A | | 1/2020 | |
| KR | 10-2020-0030967 | A | | 3/2020 | |
| KR | 20200030967 | A | * | 3/2020 | .......... H01M 10/653 |
| KR | 10-2020-0044423 | A | | 4/2020 | |
| KR | 10-2020-0052676 | A | | 5/2020 | |
| KR | 10-2128588 | B1 | | 7/2020 | |
| KR | 10-2020-0097510 | A | | 8/2020 | |
| KR | 10-2020-0109727 | A | | 9/2020 | |
| WO | WO 2020/202664 | A1 | | 10/2020 | |

OTHER PUBLICATIONS

Extended European Search Report for European Application No. 21894962.6, dated Apr. 25, 2025.

* cited by examiner

Related Art

BATTERY MODULE AND BATTERY PACK INCLUDING THE SAME

CROSS REFERENCE TO RELATED APPLICATION(S)

This application claims benefit of priority to Korean Patent Application No. 10-2020-0156686 filed on Nov. 20, 2020 in the Korean Intellectual Property Office, the disclosure of which is incorporated herein by reference in its entirety.

TECHNICAL FIELD

The present invention relates to a battery module and a battery pack including the same, and more particularly, to a battery module having improved insulation performance between parts and a battery pack including the same.

BACKGROUND ART

Secondary batteries are receiving a lot of attention as an energy source in various product groups such as mobile devices and electric vehicles. Such a secondary battery is a powerful energy resource that may replace the use of existing products using fossil fuels and is in the spotlight as an eco-friendly energy source because no by-products occur in energy use.

Recently, as the need for a large-capacity secondary battery structure, including the use of secondary batteries as an energy storage source, increases, demand for a battery pack having a multi-module structure in which battery modules including a plurality of secondary batteries connected in series/parallel are aggregated is increasing.

Meanwhile, in the case of configuring a battery pack by connecting a plurality of battery cells in series/parallel, generally, a battery module including at least one battery cell is configured, and other components are added using the at least one battery module to configure a battery pack.

Such a battery module includes a battery cell stack in which a plurality of battery cells are stacked, a module frame accommodating the battery cell stack, and a bus bar frame that covers front and rear surfaces of the battery cell stack and is equipped with a bus bar.

FIG. 1 is a perspective view of a battery module of a related art.

Referring to FIG. 1, in a battery module of the related art, a battery cell stack in which a plurality of battery cells are stacked is accommodated in a tubular module frame formed by a U-shaped frame 20 and an upper plate 21 coupled to an upper portion of the U-shaped frame 20. In addition, an end plate 80 may be coupled to an open portion at both ends of the module frame in a longitudinal direction.

Here, in order to couple the U-shaped frame 20 to the upper plate 21, welding is performed along a coupling line C as shown in FIG. 1. That is, an upper edge of a side surface of the U-shaped frame 20 and a long edge of the upper plate 21 are coupled by welding. In this case, however, since there is a risk of damage to an internal component, in particular, an insulating sheet and a buffer pad disposed to maintain insulation between the module frame and the battery cell stack, due to heat generated during welding for coupling, a region in which such an insulating sheet and a buffer sheet are attached is limited. That is, the insulation sheet cannot be sufficiently formed in a portion requiring insulation and should be attached to a region not affected by heat, and in this case, it may be difficult to secure insulation performance in the module.

DISCLOSURE

Technical Problem

An object to be solved by the present invention is to provide a battery module having improved insulation performance.

The problems of the present invention are not limited to the problems mentioned above, and other problems not mentioned will be clearly understood by those skilled in the art from the following description.

Technical Solution

An exemplary embodiment of the present invention provides a battery module including a battery cell stack in which a plurality of battery cells are stacked; a first frame member accommodating the battery cell stack and having an open upper portion; a second frame member covering the upper portion of the first frame member; a connection portion coupling the first frame member and the second frame member to each other; and an insulating sheet disposed between the battery cell stack and the second frame member, wherein the insulating sheet is disposed to extend up to the connection portion.

The first frame member may be a U-shaped frame, the second frame member may be an upper plate, the U-shaped frame may include a bottom portion and two side portions connected by the bottom portion and facing each other, and the connection portion may be disposed where an upper edge of a first side portion of the two side portions and an edge of the upper plate meet.

The connection portion may include a plurality of rivets.

The connection portion may include a plurality of first rivet holes adjacent to the upper edge of the first side portion; and a plurality of protrusions protruding from the edge of the upper plate toward the U-shaped frame and including a second rivet hole formed to correspond to the first rivet hole, and each of the plurality of rivets passes through one of the plurality of first rivet holes and one of the plurality pf second rivet hole.

The connection portion may include a plurality of hooks extending from the edge of the upper plate.

The connection portion may include a plurality of coupling holes adjacent to the upper edge of the first side portion, and the plurality of hooks may be coupled to the plurality of coupling holes, respectively.

The insulating sheet may include an extension extending past the battery cell stack to a region in which the connection portion is located.

The extension may be formed to be bent toward the battery cell stack.

The battery module may further include a buffer pad disposed between the side portion and the battery cell stack.

An upper end portion of the buffer pad may contact the insulating sheet.

Another exemplary embodiment of the present invention provides a battery pack including the battery module described above.

The edge of the insulating sheet may be L-shaped.

The edge of the insulating sheet may have a first portion extending downward toward the battery cell stack and a second portion extending outward from the first portion toward the first frame member.

A buffer pad may be disposed between the first frame member and the battery cell stack.

and the first portion and second portion may be directly over the buffer pad.

Advantageous Effects

In the battery module and the battery pack including the same according to an exemplary embodiment of the present invention, when frames for receiving a battery cell stack are formed, the frames may be connected even without a welding process, so that an insulating sheet may be formed to extend greater than the battery cell stack and a region for forming a buffer pad may be maximized, thereby sufficiently securing insulating performance in the module.

Effects of the present invention are not limited to the effects mentioned above, and other effects not mentioned will be clearly understood by those skilled in the art from the description of the claims.

MODE FOR INVENTION

It should be understood that the exemplary embodiments disclosed herein are illustrative only for better understanding of the present disclosure, and that the present disclosure may be modified in various ways. In the following description, when a detailed description of a relevant known function or configuration is determined to unnecessarily obscure the gist of the present disclosure, the detailed description and specific illustration will be omitted. In addition, for ease understanding of the present disclosure, the accompanying drawings are not drawn to real scale, but the dimensions of some components may be exaggerated.

It will be understood that, although the terms "first," "second," etc. may be used herein to describe various elements, these elements should not be limited by these terms. These terms are only used to distinguish one element from another.

The terminology used herein is for the purpose of describing particular exemplary embodiments only and is not intended to limit the invention. As used herein, the singular forms "a", "an," and "the" are intended to include the plural forms as well, unless the context clearly indicates otherwise. It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof.

Hereinafter, a battery module according to an exemplary embodiment of the present invention will be described with reference to FIGS. 2 to 4.

Figure 2:
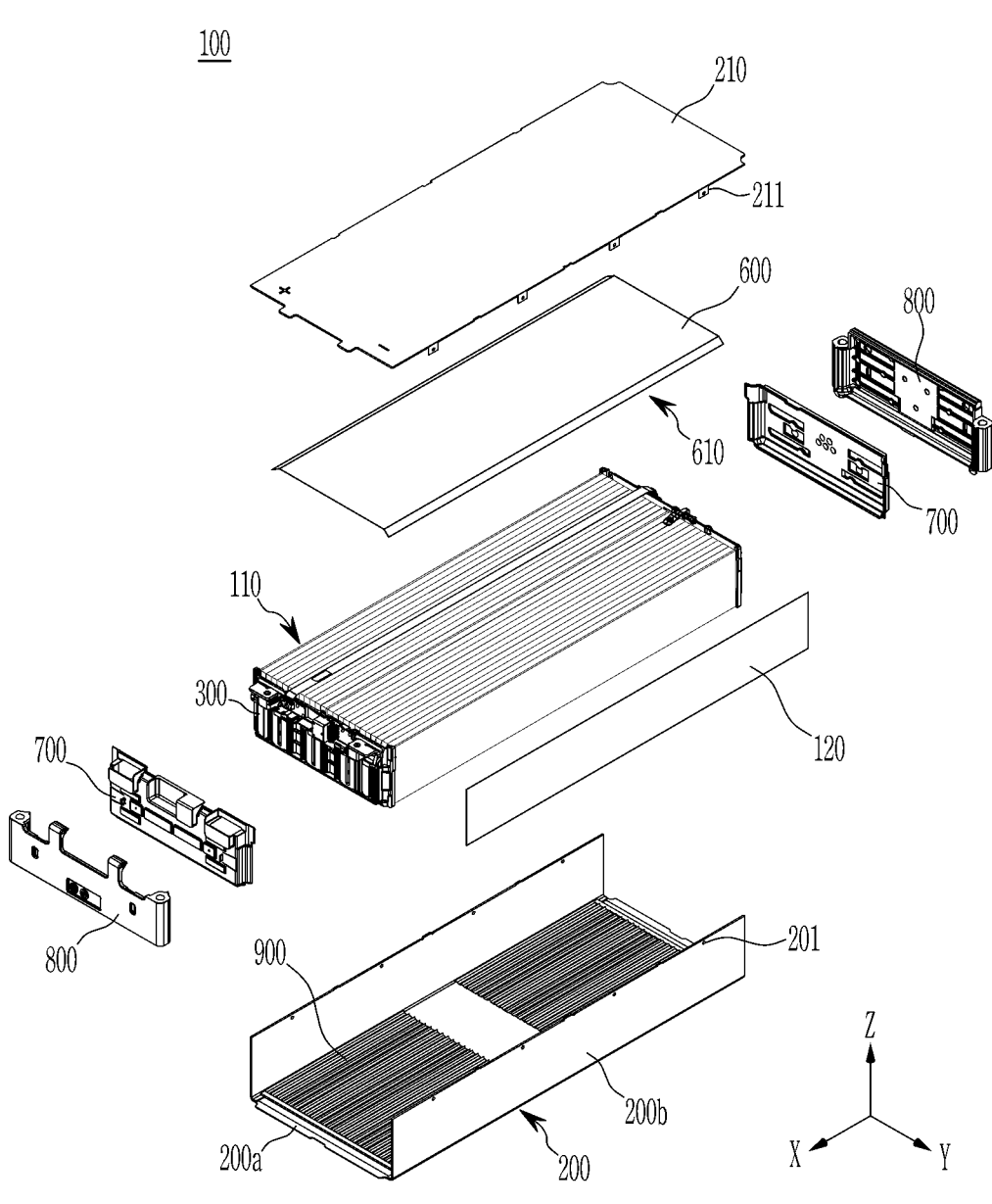
FIG. 2 is an exploded perspective view of a battery module according to an exemplary embodiment of the present invention.

FIG. 2 is an exploded perspective view of a battery module according to an exemplary embodiment of the present invention. FIG. 3 is a view showing a state in which the battery module of FIG. 2 is assembled. FIG. 4 is a cross-sectional view showing a portion A-A' of FIG. 3.

Figure 3:
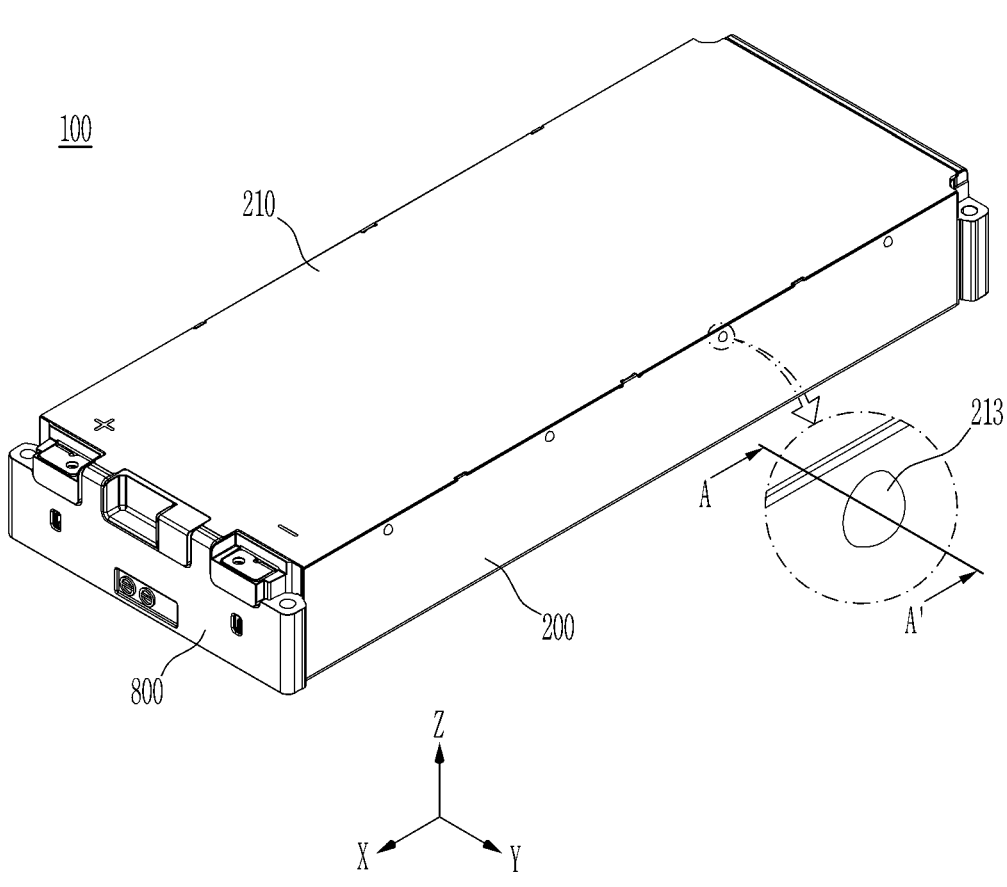
FIG. 3 is a view showing a state in which the battery module of FIG. 2 is assembled.
Figure 4:
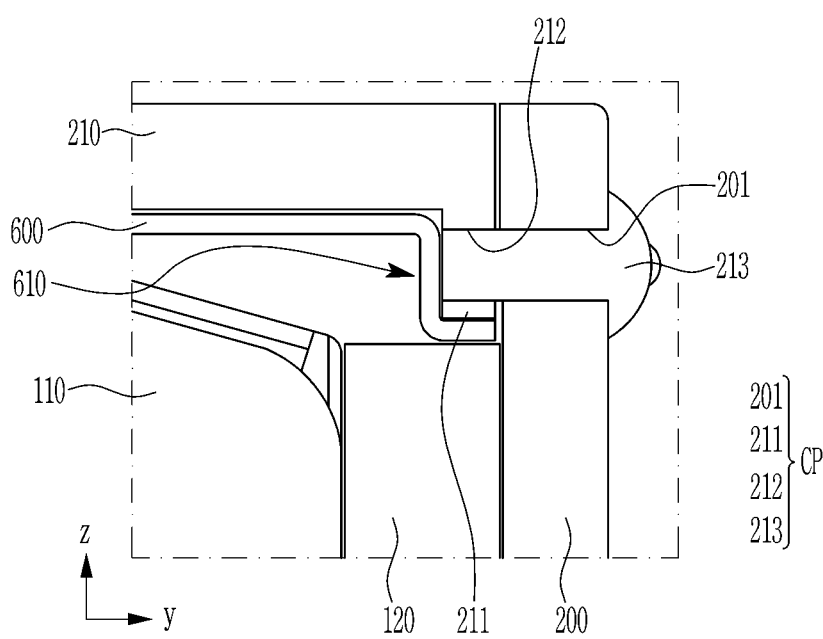
FIG. 4 is a cross-sectional view showing a portion A-A' of FIG. 3.

Referring to FIGS. 2 to 4, a battery module according to an exemplary embodiment of the present invention includes a battery cell stack 110 in which a plurality of battery cells are stacked, a first frame 200 (also referred to as a U-shaped frame) accommodating the battery cell stack 110 and having an open upper portion, a second frame member 210 (also referred to as an upper plate) coupled to cover the battery cell stack from an upper portion of the first frame member 200 and having a flat plate shape, a connection portion CP coupling the first frame member and the second frame member to each other, and an insulating sheet 600 disposed between the battery cell stack 110 and the second frame member 210. In addition, the battery module according to an exemplary embodiment of the present invention includes a busbar frame 300 formed at each of both ends of the battery cell stack 110 at both ends of the first frame member 200 in a longitudinal direction and a pair of end plates 800 coupled to an outer side of the busbar frame 300 to protect an internal component.

The battery cells included in the battery cell stack 110 are secondary batteries and may be configured as pouch-type secondary batteries. The battery cells may be configured in plurality, and the plurality of battery cells may be stacked to each other to be electrically connected to each other to form the battery cell stack 110. Each of the plurality of battery cells may include an electrode assembly, a battery case, and an electrode lead protruding from the electrode assembly.

A module frame accommodating the battery cell stack 110 may include a U-shaped frame 200 accommodating the battery cell stack 110 and having an open upper portion (upper portion in a Z-axis direction in the drawing) and an upper plate 210 coupled to an upper portion of the U-shaped frame 200 to cover the battery cell stack 110. In this case, the U-shaped frame 200 and the upper plate 210 may be coupled to each other by the connection portion CP. A detailed description thereof will be given later. The U-shaped frame 200 may include a bottom portion 200a and two side portions 200b connected to the bottom portion 200a, extending upwardly, and facing each other. Unlike the module frame shown in FIG. 2, the module frame may be formed to have a square tube shape including upper, lower, left, and right surfaces to cover four upper, lower, left, and right sides of the battery cell stack 110.

The bus bar frame 300 may be formed to cover the front and rear surfaces of the battery cell stack 110, may be positioned on the front and rear surfaces of the battery cell stack 110, and may be connected to electrode leads extending from the plurality of battery cells. In more detail, the electrode leads extending through the bus bar frame 300 are coupled to the plurality of bus bars mounted on the bus bar frame 300, so that the battery cells and the bus bars may be electrically connected to each other.

The end plate 800 may be formed on the outside of the bus bar frame 300 with respect to the battery cell stack 110 to cover the battery cell stack 110 and the bus bar frame 300.

The end plate 800 protects the bus bar frame 300, the battery cell stack 110, and various electrical components connected thereto from external impact, and at the same time guides an electrical connection between the battery cell stack 110 and an external power source. An insulating cover 700 may be inserted between the end plate 800 and the bus bar frame 300. The insulating cover 700 may block an electrical connection between the bus bar frame 300 and the outside to secure insulation performance of the battery module.

A thermally conductive resin layer 900 may be formed on a bottom surface of the module frame 200. The battery cell stack 110 may be positioned above the thermally conductive resin layer 900 to transfer heat generated from the battery cell stack 110 to the outside of the battery module. According to the present exemplary embodiment, the thermally conductive resin layer 900 may be formed of a thermal resin.

According to the present exemplary embodiment, an insulating sheet 600 is disposed between the battery cell stack 110 and the upper plate 210. The insulating sheet 600 may perform an insulating function between an upper surface portion of the battery cell stack 110 and the upper plate 210. The insulating sheet 600 may be formed of an insulating film. In addition, the insulating sheet 600 may be formed of a heterogeneous injection-molded product, a molded film, a shrink tube, or the like.

Figure 1:
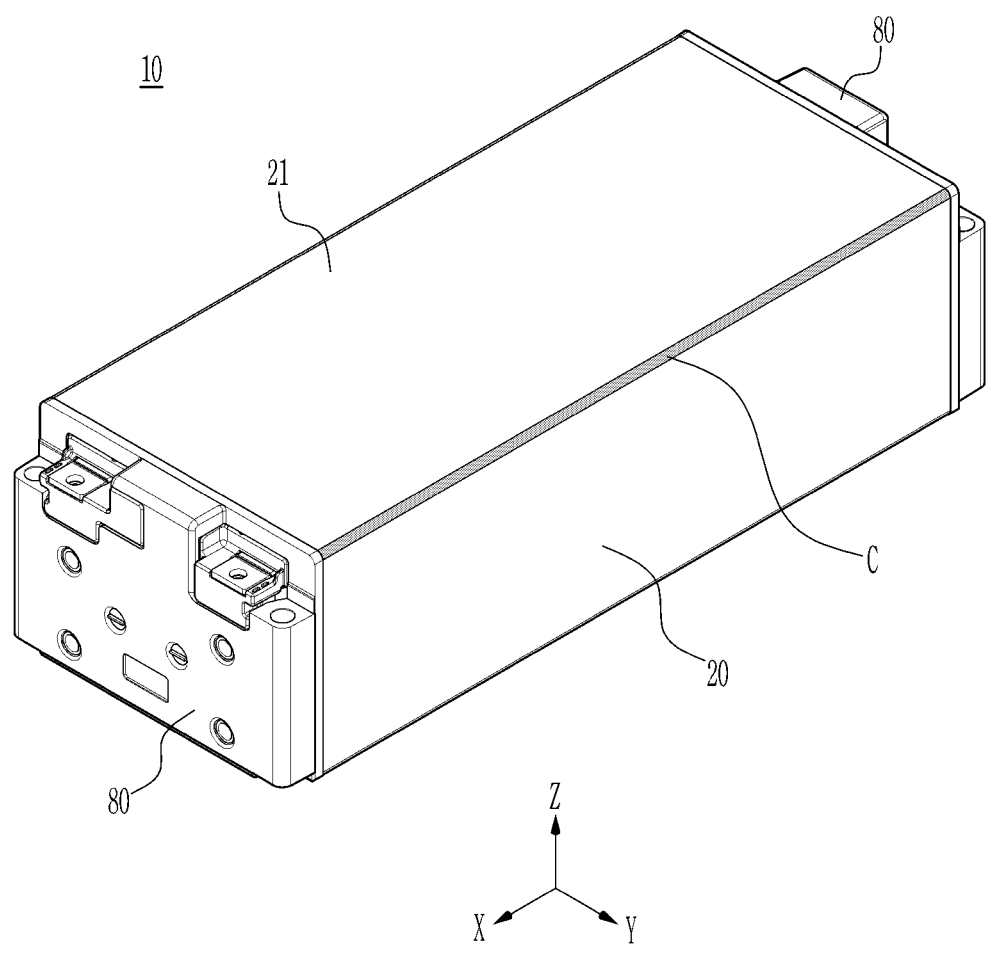
FIG. 1 is a perspective view of a battery module of the related art.

In the related art, as described in FIG. 1, since a welding process is applied for bonding the U-shaped frame 20 and the upper plate 21, when the insulating sheet 600 is formed to pass through the region in which the battery cell stack 110 is formed so as to be adjacent to a portion in which the U-shaped frame 20 and the upper plate 21 are coupled, the insulating sheet may be damaged by heat generated during welding. Therefore, there is a limitation on the region in which the insulating sheet 600 is formed.

However, in the present exemplary embodiment, since the welding process is not applied to the coupling of the U-shaped frame 200 and the upper plate 210, and instead, the U-shaped frame 200 and the upper plate 210 are connected by the connection portion CP, so that the insulating sheet 600 may not be damaged and may be disposed over a sufficient region. That is, the insulating sheet 600 is disposed to extend to a region in which the connection portion CP is located. More specifically, the insulating sheet 600 includes an extension 610 further extending toward the side portion 200b of the U-shaped frame 200 past the region corresponding to the upper surface of the battery cell stack 110. In FIGS. 2 and 4, the extension 610 refers to a portion further extending in a Y-axis direction than the upper surface of the battery cell stack 110.

The extension 610 may be formed by bending an end thereof toward the battery cell stack 110. In addition, since the extension 610 is formed in the form of a flexible film as described above, the extension 610 may be flexibly deformed according to a shape of internal parts, for example, the upper plate 210 and the side portion 200b and the connection portion CP of the U-shaped frame 200, etc. as shown in FIG. 4. As described above, the insulating sheet 600 including the extension 610 is formed to extend to the side portion 200b of the U-shaped frame 200, and thus, sufficient insulating performance may be secured up to a portion corresponding to the connection portion of the upper plate 210 and the U-shaped frame 200 in which insulation is weak in the related art.

In addition, in the present exemplary embodiment, the buffer pad 120 may be positioned between the battery cell stack 110 and the side portion 200b of the U-shaped frame 200. The buffer pad 120 is compressed when the battery cell is expanded, to serve as a buffer to control cell swelling, and thus may prevent damage to the battery cell and the module frame due to the expansion of the battery cell. To this end, the buffer pad 120 may include a material including a soft elastic material such as polyurethane (PU) or ethylene propylene diene monomer (EDPM).

Since there is a possibility in that the buffer pad 120 is also damaged by heat generated during welding in the related art, there is a limitation in a formation region of the buffer pad 120. However, in the present exemplary embodiment, since bonding is not performed by welding, a formation region of the buffer pad 120 may be sufficiently secured. That is, as shown in FIG. 4, the formation region of the buffer pad 120 may be made as large as possible upwardly in the Z-axis direction in the drawing to be in contact with the insulating sheet 600.

According to this configuration, by the insulating sheet 600 and the buffer pad 120, the portion in which insulation is weak in the related art, that is, the region of the corner where the U-shaped frame 200 and the upper plate 210 meet is sufficiently covered by an insulating material, and thus, insulating performance between the battery cell stack 110 and the module frame may be sufficiently secured.

In the present exemplary embodiment, in order to couple the U-shaped frame 200 and the upper plate 210 without welding as described above, the connection portion CP for coupling the U-shaped frame 200 and the upper plate 210 by a plurality of rivets 213 is included. That is, referring to FIG. 4, the upper plate 210 includes a plurality of protrusions 211 protruding toward the U-shaped frame 200 from the edge, that is, the edge along a longer side of the upper plate 210 in FIGS. 2 and 3. In a state in which the protrusion 211 and the upper edge of the side portion 200b of the U-shaped frame 200 overlap each other, a plurality of rivets 213 may be riveted to combine them. Accordingly, as shown in FIG. 4, a plurality of first rivet holes 201 are formed at a position adjacent to the upper edge of the side portion 200b of the U-shaped frame 200, and a second rivet hole 212 is formed on the protrusion 211 to correspond to the first rivet hole 201. In this manner, the U-shaped frame 200 and the upper plate 210 are coupled to each other through the connection portion CP including the rivet 213, the first rivet hole 201, the second rivet hole 212 and the protrusion 211, thereby firmly coupling the U-shaped frame 200 and the upper plate 210 without a welding process.

Next, another exemplary embodiment of the present invention will be described with reference to FIGS. 5 and 6.

Figure 5:
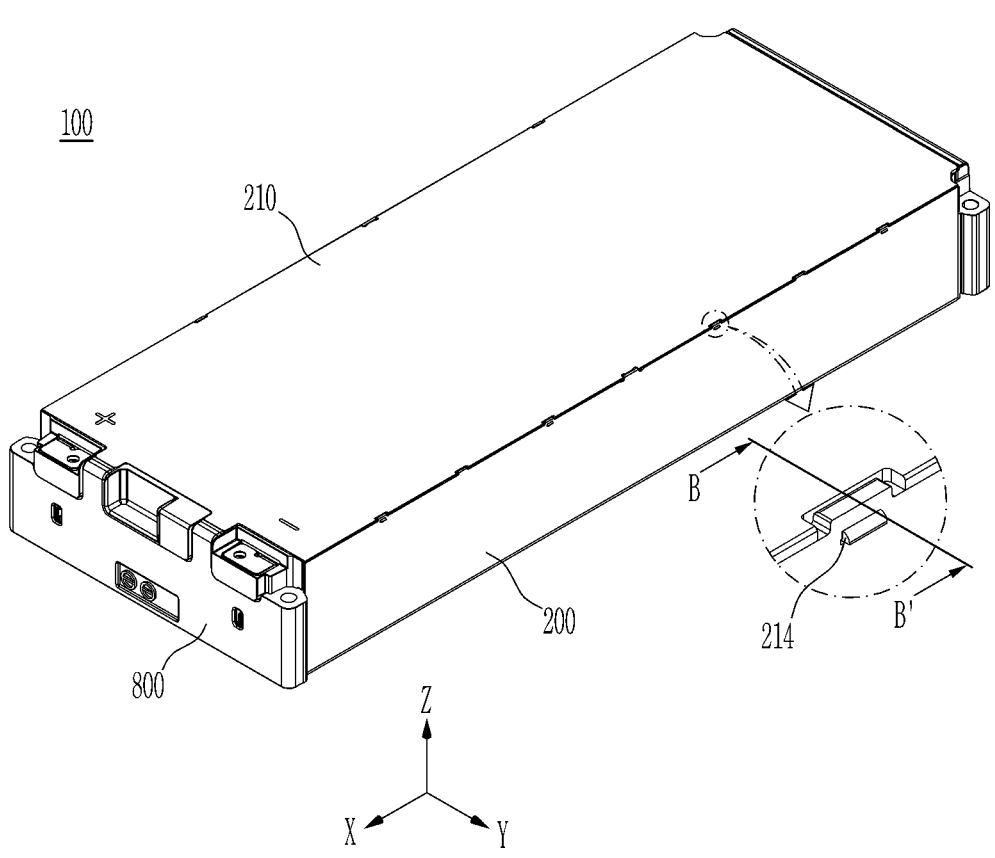
FIG. 5 is a view showing an assembled state of a battery module according to another exemplary embodiment of the present invention.

FIG. 5 is a view showing an assembled state of a battery module according to another exemplary embodiment of the present invention. FIG. 6 is a cross-sectional view illustrating a portion B-B' of FIG. 5.

Figure 6:
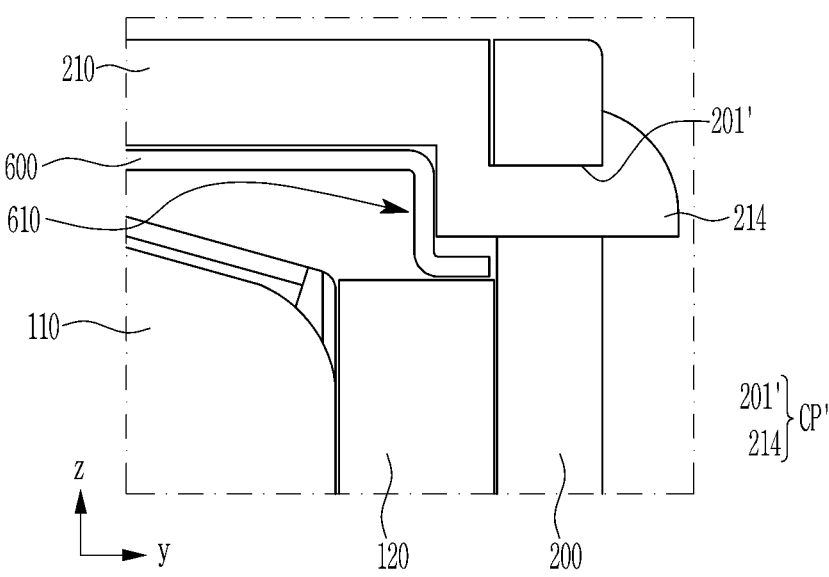
FIG. 6 is a cross-sectional view illustrating a portion B-B' of FIG. 5.

Referring to FIGS. 5 and 6, in another exemplary embodiment of the present invention, only a configuration of a connection portion CP' is different from that of the exemplary embodiment described above, and thus, the connection portion CP' will be described and detailed description of the same components will be omitted.

As illustrated in FIGS. 5 and 6, in another exemplary embodiment of the present invention, instead of performing a welding process to couple the U-shaped frame 200 and the upper plate 210 to each other, a hook 214 and a coupling hole 201' are included as the connection portion CP'.

That is, the connection portion CP' includes a plurality of hooks 214 extending from the edge of the upper plate 210. The plurality of hooks 214 extend from the upper plate 210 toward the side portion 200b of the U-shaped frame 200 as shown in FIG. 6. That is, in FIG. 6, the plurality of hooks 214 extend downwardly in the Z-axis direction and extend toward the outside of the side portion 200*b* in the Y-axis direction. A plurality of coupling holes 201' are formed to be adjacent to the upper edge of the side portion 200*b* to correspond to the location of the hook 214. By snap-fit coupling the hook 214 to the coupling hole 201', the U-shaped frame 200 and the upper plate 210 may be firmly coupled to each other without a welding process.

In addition, since the U-shaped frame 200 and the upper plate 210 may be coupled to each other without a welding process as described above, the formation region of the insulating sheet 600 and the buffer pad 120 may extend up to the portion in which the connection portion CP' is formed, and thus, sufficient insulating performance may be secured even in the corner portion of the battery module vulnerable to insulation in the related art, that is, in the portion in which the U-shaped frame 200 and the upper plate 210 are coupled to each other.

The battery module described above may be included in a battery pack. The battery pack may have a structure in which one or more battery modules according to the present exemplary embodiment are collected and packed with a battery management system (BMS) that manages the temperature or voltage of the battery and a cooling device.

The battery pack may be applied to various devices. Such a device may be applied to transportation means such as an electric bicycle, an electric vehicle, and a hybrid vehicle, but the present invention is not limited thereto and may be applied to various devices that may use a battery module, which also falls within the scope of the present invention.

Although the exemplary embodiments of the present invention have been illustrated and described hereinabove, the present invention is not limited to the specific exemplary embodiments described above, and may be variously modified by those skilled in the art to which the present invention pertains without departing from the scope and spirit of the present invention as claimed in the claims. These modifications should also be understood to fall within the technical spirit and scope of the present invention.

DESCRIPTION OF REFERENCE NUMERALS

100: battery module
110: battery cell stack
120: buffer pad
200: first frame member (U-shaped frame)
210: second frame member(upper plate)
600 insulating sheet
610: extension
CP: connection portion

The invention claimed is:

1. A battery module comprising:
a battery cell stack in which a plurality of battery cells are stacked;
a first frame member accommodating the battery cell stack and having an open upper portion;
a second frame member covering the upper portion of the first frame member;
a connection portion coupling the first frame member and the second frame member to each other; and
an insulating sheet disposed between the battery cell stack and the second frame member, wherein an extension at an edge of the insulating sheet has a first section extending downward toward the battery cell stack and a second section extending outward from an end of the first section toward the first frame member,
wherein the connection portion includes at least one protrusion extending downward from the second frame member, and
wherein the second section of the extension of the insulating sheet extends under the at least one protrusion.

2. The battery module of claim 1, wherein the first frame member is a U-shaped frame,
wherein the second frame member is an upper plate,
wherein the U-shaped frame includes a bottom portion and two side portions connected by the bottom portion and facing each other, and
wherein the connection portion is disposed where an upper edge of a first side portion of the two side portions and an edge of the upper plate meet.

3. The battery module of claim 2, wherein the connection portion includes a plurality of rivets.

4. The battery module of claim 3, wherein the connection portion includes:
a plurality of first rivet holes adjacent to the upper edge of the first side; portion,
wherein the at least one protrusion is a plurality of protrusions protruding from the edge of the upper plate toward the U-shaped frame and including a plurality of second rivet holes formed to correspond to the plurality of first rivet holes, and
wherein each of the plurality of rivets passes through one of the plurality of first rivet holes and one of the plurality of second rivet holes.

5. The battery module of claim 2, wherein the connection portion includes a plurality of hooks extending from the edge of the upper plate.

6. The battery module of claim 5, wherein the connection portion includes a plurality of coupling holes adjacent to the upper edge of the first side portion, and
wherein the plurality of hooks are coupled to the plurality of coupling holes, respectively.

7. The battery module of claim 1, wherein the extension extends past the battery cell stack to a region in which the connection portion is located.

8. The battery module of claim 7, wherein the extension is formed to be bent toward the battery cell stack.

9. The battery module of claim 2, further comprising a buffer pad disposed between the first side portion and the battery cell stack.

10. The battery module of claim 9, wherein an upper end portion of the buffer pad contacts the insulating sheet.

11. A battery pack including the battery module according to claim 1.

12. The battery module of claim 1, wherein the extension of the insulating sheet is L-shaped.

13. The battery module of claim 1, further comprising a buffer pad disposed between the first frame member and the battery cell stack,
wherein the first section and the second section are directly over the buffer pad.

* * * * *